Aug. 28, 1962

K. LAAS 3,051,794

CIRCUIT ARRANGEMENT FOR CONNECTORS HAVING ACCESS TO P.B.X TELEPHONE LINES AND CONTROLLED BY MARKER DEVICES

Filed March 4, 1959

5 Sheets-Sheet 1

Inventor:
Kurt Laas.
By [signature]
Atty.

Aug. 28, 1962

K. LAAS 3,051,794

CIRCUIT ARRANGEMENT FOR CONNECTORS HAVING ACCESS TO P.B.X TELEPHONE LINES AND CONTROLLED BY MARKER DEVICES

Filed March 4, 1959

5 Sheets-Sheet 2

Inventor:
Kurt Laas.
By. [signature] Atty.

Aug. 28, 1962 K. LAAS 3,051,794

CIRCUIT ARRANGEMENT FOR CONNECTORS HAVING ACCESS TO P.B.X TELEPHONE LINES AND CONTROLLED BY MARKER DEVICES

Filed March 4, 1959 5 Sheets-Sheet 3

Inventor.
Kurt Laas.
By. [signature] Atty

Inventor:
Kurt Laas.
By [signature] Atty.

| | A | H | R | S | T | W | |
|---|---|---|---|---|---|---|---|
| | | | R | | | | |
| 1. Jmp. | A | | R | S | | | RS |
| | | | | S | | | |
| 2. Jmp. | A | H | | S | | | S |
| | | H | R | S | | | |
| 3. Jmp. | A | H | R | | T | | R T |
| | | H | | | T | | |
| 4. Jmp. | A | | | | T | | T |
| | | | R | | T | | |
| 5. Jmp. | A | | R | S | T | | RST |
| | | | | S | T | | |
| 6. Jmp. | A | H | | S | T | | ST |
| | | H | R | S | T | W | |
| 7. Jmp. | A | H | R | | T | W | R T W |
| | | H | | | T | W | |
| 8. Jmp. | A | | | | T | W | TW |
| | | | R | | T | W | |
| 9. Jmp. | A | | R | S | T | W | RSTW |
| | | | | S | T | W | |
| 10. Jmp. | A | H | | S | T | W | STW |

ESa

Inventor:
Kurt Laas.
By [signature] Atty.

United States Patent Office 3,051,794

Patented Aug. 28, 1962

3,051,794

CIRCUIT ARRANGEMENT FOR CONNECTORS HAVING ACCESS TO P.B.X TELEPHONE LINES AND CONTROLLED BY MARKER DEVICES

Kurt Laas, Munich, Germany, assignor to Siemens and Halske Aktiengesellschaft, Munich, Germany, a corporation of Germany Filed Mar. 4, 1959, Ser. No. 797,235
Claims priority, application Germany Mar. 11, 1958
13 Claims. (Cl. 179—18)

Figure 1:
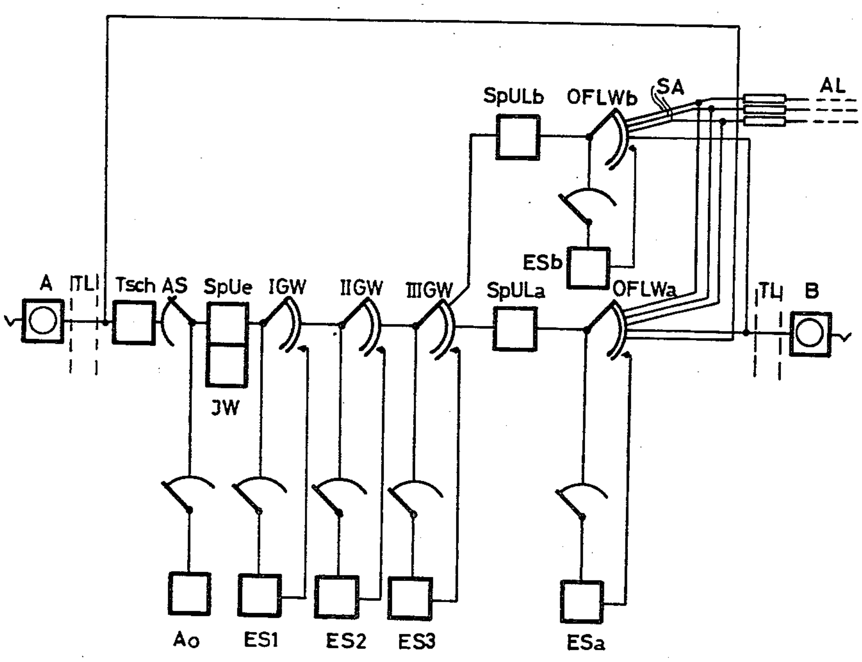

This invention is concerned with a circuit arrangement for connectors having access to P.B.X. telephone lines and controlled by marker devices.

In telephone exchanges having selector stages which are controlled or set by central markers, that is, marker devices common to several selectors, it is necessary to mark at the connectors not only single-line subscribers' lines but also private branch exchange subscribers' lines, in other words groups of lines which are reached responsive to dialing the same subscriber's number and individually selected by automatic hunting to obtain an idle one of the group of lines belonging to a private branch exchange number.

If the number of connectors having access to a group of 100 subscribers is only so large that the marker device common thereto, which will hereinafter be called the markers, is sufficient to serve the connectors, for instance one marker at most for twelve connectors, no difficulties result in the marking of the single-line subscribers or of the private branch exchange subscribers. If, however, due to the requirements of heavy traffic, the number of connectors per group of one hundred subscribers is increased, for instance to 16 or 24, the number of common markers must also be increased, for instance from one to two markers. In this case, however, difficulties result in connection with the testing of the private branch exchange lines.

The marking of a private branch exchange subscriber is effected by marking a plurality of lines by a single subscriber call number, that is, several outlets at the connector must be identified by the same marking step of the marker. This requirement on the one hand and on the other hand the requirement specific to private branch exchange subscriber lines, of a preliminary checking as to whether the lines of the private branch exchange subscriber to be tested by the connector are idle or busy, require a relay chain circuit of all lines extending by way of the line relays in the line circuits of the lines of the private branch exchange subscriber. Since this relay chain circuit must lie also at the marking multiple of a second marker of the same line selector group, so-called crossed connections and thus wrong numbers can occur in case of simultaneous testing of two markers of the same connector group. This difficulty could be avoided, for instance, by means of a relay chain circuit allowing in all instances operation of only one of the two markers. However, this procedure is unsuitable for groups of high-calling rate subscribers.

The present invention avoids a relay chain circuit involving the lines of the private branch exchange subscriber by means of relays, belonging to the subscribers, of the individual lines in the marking multiple and thus avoids the danger of crossed connections upon simultaneous testing by a plurality of markers on one group of connectors by causing the setting sets to mark the group contacts in the multiple of an auxiliary contact bank of the connector, over which the individual lines are thereupon tested, by means of a relay set associated with the occupied connector, while in the multiple of another auxiliary contact bank of the connector, the single-line and private branch exchange lines are marked by means of the same testing relay, so that the single-line subscribers are marked directly, while the private branch exchange subscribers are merely given a preliminary marking by way of switching means and the condition of the lines of the private branch exchange subscriber is established by a test circuit produced simultaneously over the first auxiliary wiper of the connector, whereupon the testing means thereof produce the marking circuit of the lines of the private branch exchange subscriber in case of an idle subscriber's line in order to stop the connector wipers in engagement with the bank contacts thereof.

A multiple switching of the marking of a private branch exchange subscriber in the several, preferably two, markers of a larger group of connectors is in this way avoided so that the markers can operate simultaneously in parallel. If two markers happen to be set simultaneously to the same private branch exchange subscriber, the test relays of the two line sets can, of course, operatively respond at the same time, and the two connectors which have been set by the markers can be switched to the preceding connection devices (connector relay set) which then in their turn test the private branch exchange subscriber lines at the same time by means of their test relays. However, due to the tolerances of these test relays, one connecting device will then obtain the connection, while the other connecting device will be released, causing transmission of a busy signal to the calling subscriber. Wrong connections are at any rate avoided.

In accordance with one embodiment of the invention, due to the preparatory marking circuit of the private branch exchange subscribers, the test circuit for the subscriber connections of the private branch exchange subscriber lines is unlocked, thereby causing unlocking of an electronic amplifier element, preferably a transistor amplifier, lying in the last test circuit, whereupon the test relay of the marking circuit, which relay is located in a common branch of the two circuits, responds operatively in the transistor test circuit in order to stop the wipers of the connector when this test circuit, ascertaining an idle private branch exchange line, is traversed by the amplified current of the transistor amplifier.

In accordance with a further object and feature of the invention, the comparative marking of the private branch exchange subscribers takes place by way of the associated contact bank of the connector in a circuit of high resistance, while the marking of the single-line subscribers and of the night-call numbers is effected in a circuit of low resistance. The high-resistance marking circuit initially does not permit actuation of the test relay but only unlocks the electronic amplifier element in the test circuit for the line switchings of the private branch exchange line, whereupon the increased amplifier current flows in the corresponding test circuit.

It should also be mentioned that by the arrangement in accordance with the invention the private branch exchange connections need not be arranged directly successively one after the other in the contact bank, but may be arranged distributed in any manner within a decade.

Figure 2A:
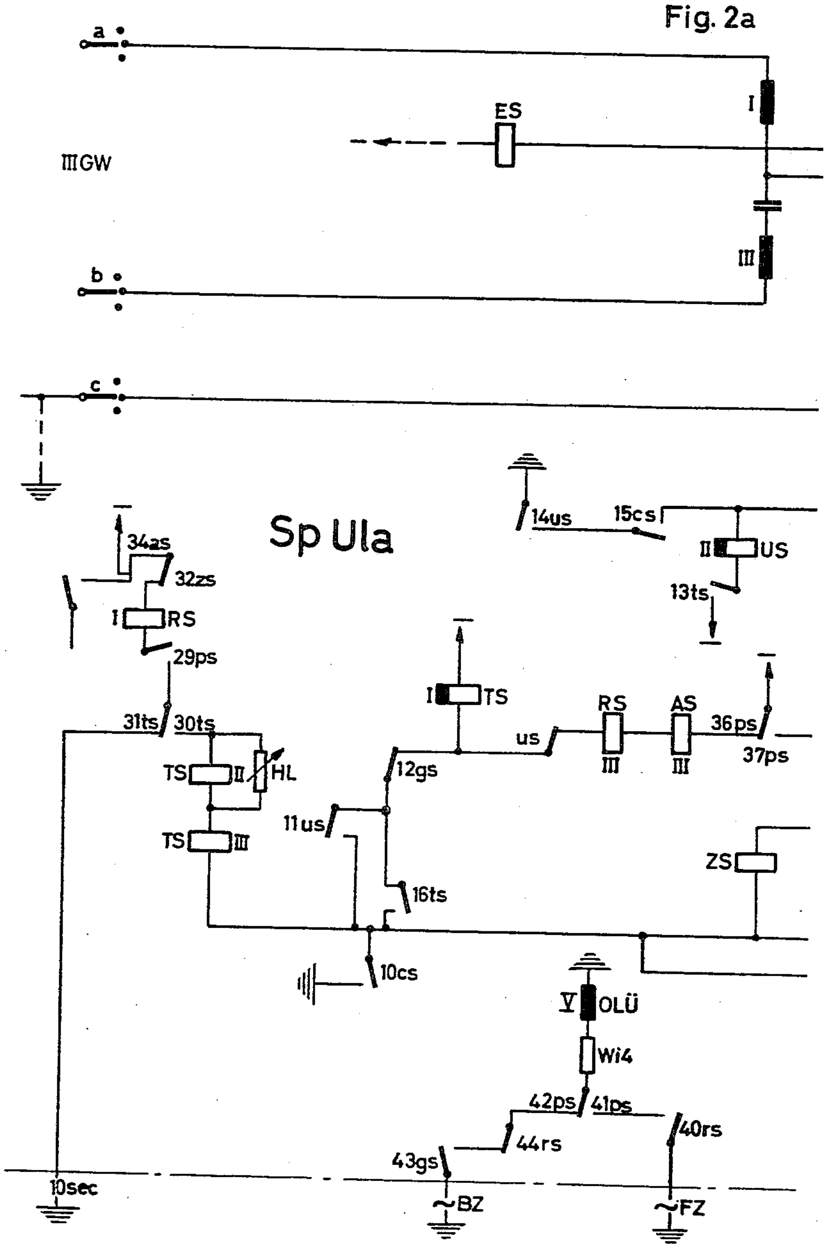
Figure 2B:
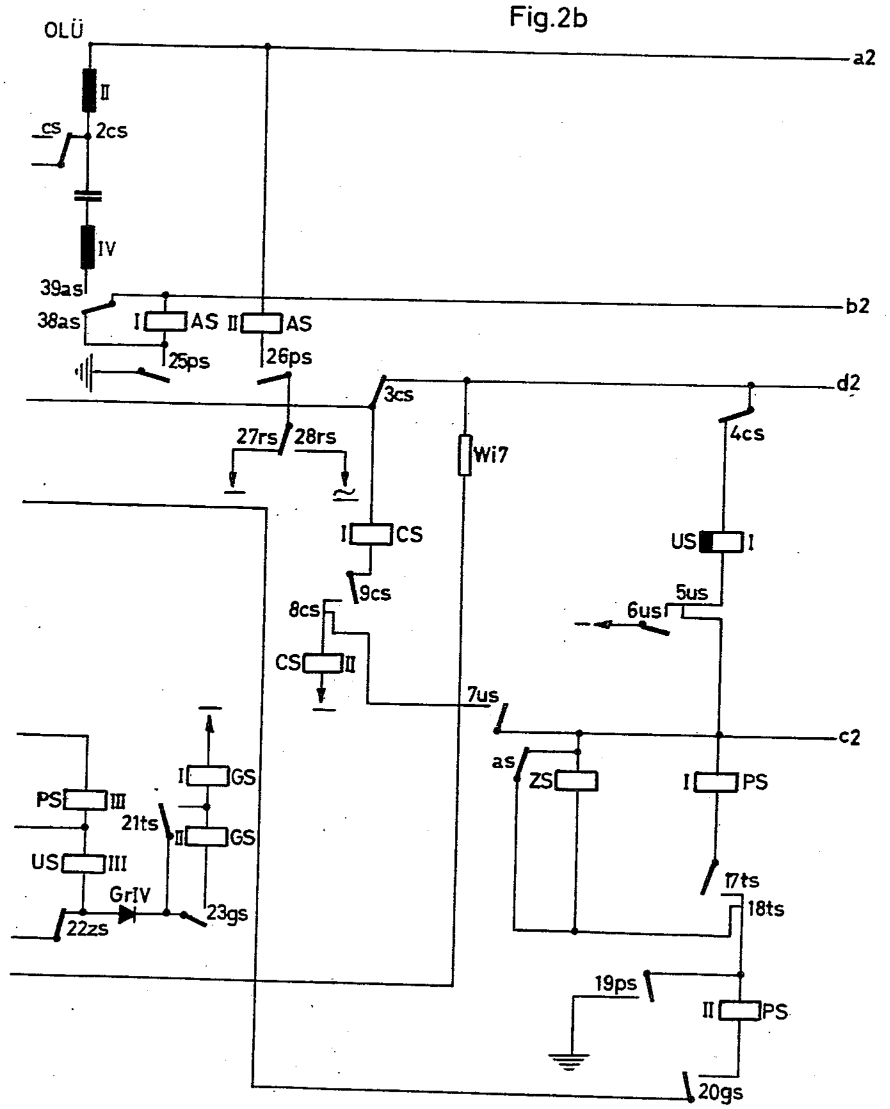
Figure 3B:
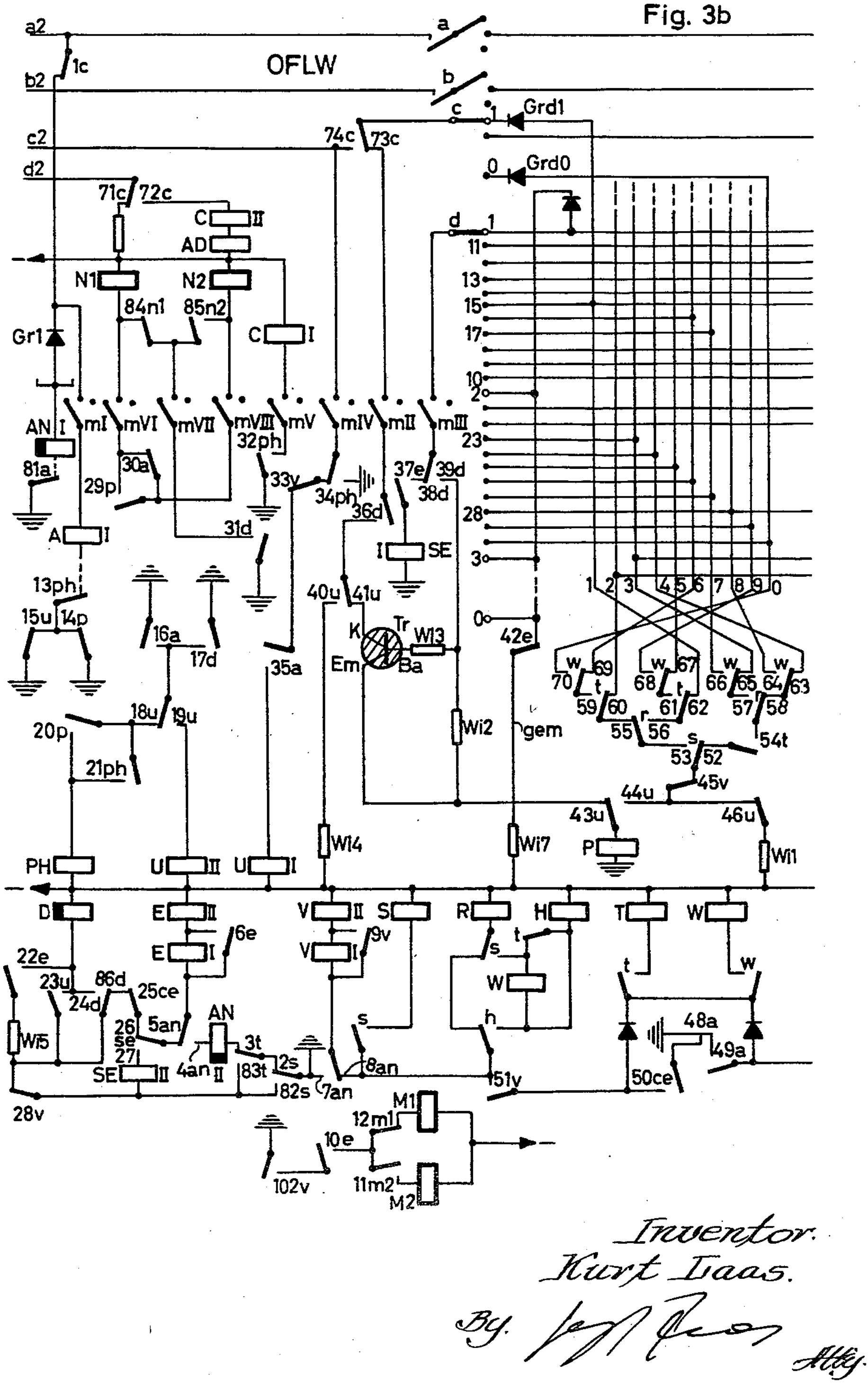
Figures 3C, 4:
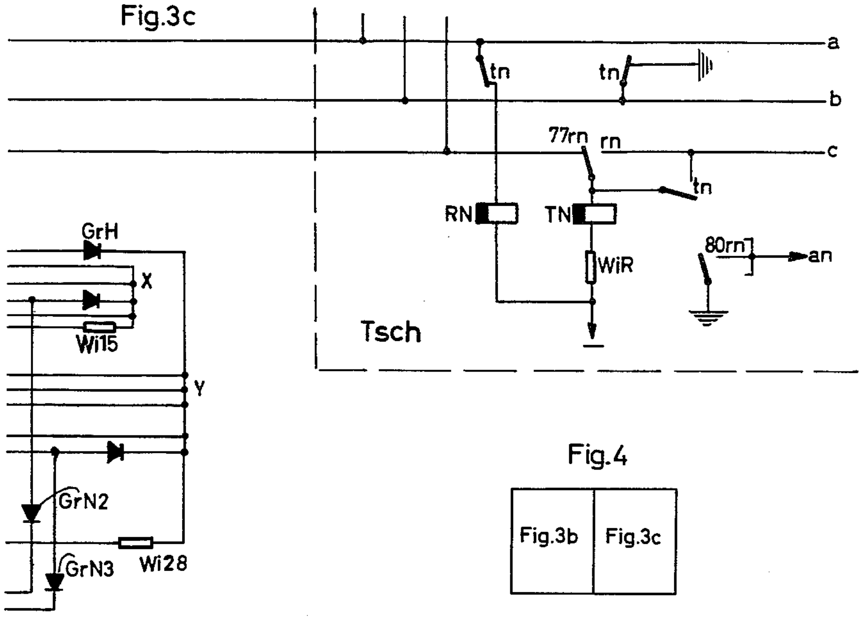
Figure 3A:
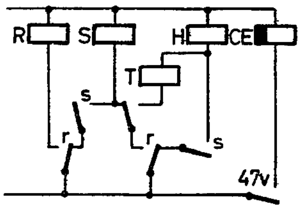

FIGS. 2*a*, 2*b*, 3*a*, 3*b*, 3*c* show one embodiment of the invention, employed in a telephone system utilizing high-speed rotary switches, particularly motor operated rotary switches, in all selection stages, and utilizing in each case, markers associated in common with a group of switches. FIG. 4 shows how FIGS. 3*b* and 3*c* are to be placed together.

The manner of establishing a connection in such a telephone system will now be explaned with reference to the block diagram shown in FIG. 1.

If the individual subscriber A wishes to extend a call to the individual subscriber B, then upon the picking up of the telephone at the calling station, a circuit is produced extending over the closed loop of the two-wire subscriber line TL in the customary manner to the subscriber line circuit TS*ch*, causing the line finder AS to seek the calling line. Common traffic distributors AO are associated in known manner with the line finders. The line finder AS is fixedly coupled with a first group selector IGW and forms a connecting set in which a battery feed transmission S*p*U*e* is included, such transmission being seized or occupied after the extending of the connection path over the line finder. With the battery feed S*p*U*e* there is associated a pulse storer JW, hereinafter called pulse repeater, which stores the trains of numerical pulses sent out by the calling subscriber and transmits such pulses without conversion to a marker ES after such setting set ES has been prepared for the recipt thereof. After the battery feed transmission is occupied, the subscriber A receives the dial tone advising him to proceed with the dialing of the desired number. By means of his dial, he thereupon transmits the corresponding trains of impulses. When the storing in the pulse repeater JW commences, a signal is given from the battery feed transmission to the connecting selector of the marker ES1 of the first group selector IGW which causes the connecting selector to seek and to establish connection with the occupied battery feed transmission. After the connection has been established, the pulse repeater is caused to commence with the transmission of the trains of the pulses which had meantime been stored. The first train of pulses passes into the marker ES1 and is evaluated by the latter in the form of the optional connecting of marking potential to a given marking line out of ten. The selected marking line, by way of a marking multiple in an auxiliary contact bank of the first group selector, causes the setting thereof to the decade determined by the marking line. The different decades lie in the contact bank of the rotary selector of this selector stage as in all other selector stages one in back of the other. After the decade selection, the group selector automatically starts hunting in the corresponding decade, thereby causing seizure of a second group selector IIGW. The marker ES2 of the second group selector is now in its turn operatively affected by the battery feed transmission S*p*U*e*. As soon as its connecting selector has found the seized line, the second train of current pulses is transmitted from the pulse repeater. It passes to the marker ES2 which again evaluates it by selecting a given marking line in the same manner as in the case of the first group selector. The second group selector is set to the corresponding decade. It thereupon seeks by hunting an idle third group selector IIIGW; the battery feed transmission S*p*U*e* now causes actuation of the connecting selector of the marker ES3 associated with the third group selection stage. As soon as the latter has found the seized line, the third train of pulses is transmitted from the storer JW and passes into the marker ES3. The latter evaluates it in the same manner as the preceding group selectors. The third group selector occupies an idle connector OFLW. Battery feed relay sets S*p*UL are inserted in the line to the connector, permanently associated therewith.

The group of connectors occupied by the decade reached by the third group selector, over which group the subscriber-hundreds containing the desired subscriber B is reached in the customary manner, may consist of a large number of connectors. For this reason, a common marker ES*a* or ES*b* is associated in each case with a connector group OFLW*a* and OFLW*b* respectively. If one marker should become inoperative, the other marker alternately takes over the marking multiple of the disturbed marker. If the third group selector for instance occupies an idle connector OFLW*a* or its battery feed relay set S*p*UL*a*, a demand criterion (in the form of voltage over a line conductor) is transmitted from the battery feed transmission S*p*U*e* at the beginning of the connecting path to the marker ES*a* of the occupied connector, which effects the connecting of the connecting selector to the occupied line. The marker is thereupon ready for receiving the next to the last digit from the impulse repeater JW. The impulse repeater transmits the tens digit in the same manner as to the group selectors, to the marker ES*a* which evaluates it in the selection of a given marking line in the decade marking multiple of the connector. This results in the setting of the connector to the corresponding decade. Thereupon the marker is again released; however, in the battery feed relay set S*p*UL*a* of the connector, the tens series already sent out is retained in a local circuit. The connecting selector remains for the time being at the occupied OFLW.

If the last digit (units digit) is already stored in the impulse repeater at the beginning of the connection, voltage is again present in the battery feed transmission S*p*U*e* associated with the impulse repeater, as a demand criterion on the line conductor *a*, which again affects the marker ES*a*. If the connecting selector is no longer on the occupied line, it is again actuated to establish connection therewith. Thereupon the impulse repeater transmits the units digit to the marker ES*a*; it is again evaluated here, that is, a given marking line is selected, but after the units digit, the marking lines are shifted from the decade marking multiple to another marking multiple, the single-step marking multiple. Depending upon this marking, the connector is set to the desired individual step at which the subscriber's line is connected with the desired subscriber B. After the setting of the connector, its seizure circuit is maintained and the marker ES*a* is released. In the battery feed relay set S*p*UL*a*, there then takes place the testing of the connection B controlled by the connector as to whether it is idle or busy. Depending on the outcome of this testing, the feed relay set of the connector then effects the remaining known operations, such as checking, initial ringing, further ringing, busy signal transmission, etc.

The release of the connection is effected when the calling subscriber restores the receiver.

If the subscriber A wishes to extend a call to a private branch exchange subscriber SA, the connection is up to the connector stage made in the same way as a call to an individual line subscriber B. By the marker ES*a* of the connector however, a private branch exchange subscriber is now marked in the latter. The connector, after the setting thereof controlled by the marking, begins to hunt for an idle one of the lines of the private branch exchange subscriber.

With reference to FIGS. 2 and 3, there will now be described in detail the switching operations which take place upon the setting of the connector to an individual line subscriber and a private branch exchange subscriber. FIGS. 2*a* and 2*b* show the switching of the feed relay set S*p*UL*a* and FIGS. 3*b* and 3*c*, the marker ES*a* with connecting switch and combination (local and toll) switch OFLW*a*. A detailed description of the switching operations effected in such extension of calls in the preceding selection stages is omitted because it is not necessary for an understanding of the present invention.

There will first of all be described the extension of a call to a single-line subscriber accessible to the connector OFLW*a*, which subscriber may have the terminal number "16."

When the third group selector has found an idle connector OFLW*a* (FIG. 3), then after the connecting of the two line conductors or over the selector wipers of the third group selector from the feed transmission S*p*U*e* at the beginning of the connection, voltage lies on the line conductor *a* which acts by way of the electrically connected line conductors in the feed relay set S*p*UL*a* (FIG. 2) of the connector in the succeeding circuit as a demand signal on the marker of the connector:

(1) (FIG. 2) —, line conductor *a*, OLUI, 2*cs*, OLUII, conductor *a*2, (FIG. 3) 1*c*, G*r*1, ANI, 81*a*, +.

In this circuit relay AN energizes and connects relay E:

(2) +, 2*s*, 3*t*, ANII, 4*an*, EI, EII, —.

Relay E over its contact 6*e* short-circuits its winding I, thereby making it slow-to-release. Relay AN connects relay V:

(3) +, 7*an*, VI, VII, —.

Relay V short-circuits its winding I over contact 9*v* so that it is made slow-to-release, causing it to remain energized during the receipt of the pulses of a selection series. Relay E, over its contact 10*e*, connects the motor of the connecting selector:

(4) +, 102*v*, 10*e*, cam contact 12*m*1, field coil M1, —.

The connecting switch as well as the connector and all other switches of the selection stages is a motor switch of known type. The wipers of such a switch are driven by a motor which comprises two field coils displaced mutually by 90° and in the point of intersection of the axes of which is disposed an unwound rotatably supported armature. The latter, via gear countershaft, places the switch shaft, together with the selector wipers in rotation. The field coils are alternately connected by cam contacts controlled by the switch shaft. When both field coils are traversed by current, the rotation of the selector will be stopped.

The rotation of the connecting switch is started upon energization of the field coil M1, responsive to the closure of cam contact 11*m*2 and opening of the cam contact 12*m*1, whereby the field coil M2 is connected to current:

(5) +, 102*v*, 10*e*, cam contact 11*m*2, M2, —.

The connecting switch rotates until its wipers find, at the start of the connection, the seized feed transmission in which voltage lies on the line conductor *a*. As a result, upon the testing of the connecting switch on this line, relay A is energized:

(6) (FIG. 2) —, line conductor *a*, OLUI, 2*cs*, OLUII, conductor *a*2, (FIG. 3) 1*c*, wiper MI, AI, 13*ph*, 14*p*/15*u*, +.

Relay A connects relay CE:

(7) +, 49*a*, 47*v*, CE, —.

Directly thereupon the transmission of the next to the last dial series (tens digits) commences in the feed transmission at the start of the connection, due to the fact that the voltage on the line conductor *a* is interrupted in a pulse-like manner. Relay A in the marker ES*a* (FIG. 3) deenergizes in a pulse-like manner. It transmits the pulses to the counting relay circuit comprising the relays H, R, S, T, W, which evaluates the pulses by connecting after each train of pulses a given number of relays while others are not connected. Ten different relay combinations can in this manner be characterized corresponding to the digits 0, 1 . . . 9. The condition of the counting relay circuit at the end of the individual pulses of a train of pulses in connection with which relay A is energized is apparent from the table given in FIG. 3*a*. By referring to this table, the current paths for the counting relay circuit can readily be noted from the diagram.

As has been assumed, the digit "1" has been transmitted as next to the last digit (tens digit). Accordingly, the relays R and S of the counting relay circuit are energized after the termination of this dial series. Since relay A remains energized after a train of pulses, the winding I of relay AN is disconnected at contact 81*a* and the winding II of relay AN is disconnected by the opening of contact 2*s*, so that relay AN deenergizes. Due to deenergization of relay AN, relay E also deenergizes. Since relay A is actuated, relay V is also caused to release with the customary time delay. Relay V upon releasing interrupts at contact 47*v* the circuit for the relay CE (cf. circuit 7). Relay CE releases with considerable delay; during this release time, relay U of the setting set is connected with voltage on the incoming private conductor *c*2, on which, in the feed relay set *Sp*UL*a* of the connector, relay US is connected with ground from the preceding group selector:

(8) +, *c*-wiper (IIIGW), *c*-conductor (FIG. 2), 3*cs*, 4*cs*, USI, 5*us*, conductor *c*2 (FIG. 3), wiper *m*IV, 34*ph*, 33*v*, 35*a*, UI, —.

In this circuit, both relay U of the marker and relay US of the preceding feed relay set energize. The two relays establish that the decade selection has been effected by the tens digit. In the feed relay set (FIG. 2) relay US is held in the following circuit independently of the setting set:

(9) +, *c*-arm/IIIGW, *c*-conductor, 3*cs*, 4*cs*, USI, 6*us*, —.

The decade selection is in this manner stored.

In the marker of the connector, after the actuation of relay U, relay D is energized:

(10) +, 82*s*, 28*v*, 23*u*, D, —.

Relay D starts the operation of the motor of the connector:

(11) +, 31*d*, wiper *m*VII, cam contact 84*n*1, field coil N1, —.

After the operative actuation of the field coil N1, cam contact 84*n*1 is opened and cam contact 85*n*2 is closed. The field coils are in this manner alternately connected by the alternately actuated cam contacts; the connector starts operating and seeks the marked decade 1. It may be pointed out again here that after the actuation of relay D, the latter is held by way of its own contact 24*d* independently of relay U:

(12) +, 82*s*, 28*v*, 24*d*, D, —.

Relay U, after energization of relay D, holds itself independently of relays A, V, PH in the following circuit:

(13) +, 17*d*, 19*u*, UII, —.

Relay U connects the test relay P to the decade marking circuit in which it is connected by way of contact 44*u* with ground at the contact pyramid of the counting relay circuit. The decade marking is in this way effected over the contact bank of the *c*-wiper of the connector. As soon as the connector has arrived at step 1 of decade 1, the following test circuit is closed:

(14) +, P, 44*u*, 45*v*, 53*s*, 56*r*, 62*t*, marking conductor 1, rectifier G*r*–*d*1, wiper *c* (1), 73*c*, wiper *m*II, 36*d*, 40*u*, Wi4, —.

In this circuit, relay P energizes and by closing its contact 29*p* stops the operation of the connector since both field coils N1 and N2 are now traversed by current. The circuit of relay A is interrupted by the opening of contact 14*p*. Relay A releases. The holding circuits of the connected relays R and S of the counting relay circuit are interrupted due to the opening of contact 49*a*. This results in deenergization of the relays D, U and P. As a result, the marker is released and is ready to receive the units digit.

When the units digit has been fed into the feed transmission *Sp*U*e* at the beginning of the connecting path, voltage is again present at the conductor as demand criterion for the marker ES*a* of the connector. As a result, relay AN is energized in the setting set (cf. circuit 1). Furthermore, relays E (cf. circuit 2) and V (cf. circuit 3) are energized. Relay AN is held by energization of its second winding. Relay E connects the motor of the connecting switch (cf. circuit 4). After having performed its function, the connecting switch connects itself again with the feed transmission *Sp*U*e*. Thereupon, relay A of the marker energizes in the relay set in the circuit to the feed transmission extending over the conductor *a* (cf. circuit 6). However, if the switch is still on the line to be extended, relay A energizes immediately. By opening contact 81*a*, it disconnects the one winding of relay AN. Relay CE is energized by relay A (cf. circuit 7).

The pulses of the units series now arrive from the feed transmission *Sp*U*e*, whereby the voltage on the line conductor *a* is intermittently interrupted. Relay A of the setting set follows the pulses incident to each release and actuation. Relay A controls the counting relay circuit. Since digit "6" has been assumed as the units digit, relays S and T of the counting relay circuit are energized at the end of the train of pulses in accordance with the relay table, FIG. 3*a*. Upon actuation of relay S, relays E and AN deenergize with time delay due to the opening of the contact 2*s*. Relay V is held by a short-circuited winding during the arrival of the train of pulses after relay AN has released:

(15) +, 48*a*, 50*ce*, 51*v*, 8*an*, 9*v*, VII, —.

Relay CE, being slow-to-release is also held during the train of pulses.

Upon completion of the train of pulses, relay A remains energized. As a result, relay V releases with some delay; thereupon relay CE releases with considerable delay. The marking conductor 6 is extended in the circuit:

(16) —, W*i*1, 46*u*, 45*v*, 53*s*, 55*r*, 59*t*, 69*w*, marking conductor 6 . . . .

After the release of relay V, the winding I of relay U is during the release of relay CE again connected to voltage for testing for ground potential in the relay feed set S*p*UL*a* by way of the wiper arm *m*IV on the incoming *c2*-conductor. In the feed relay set (FIG. 2), ground potential is now however absent since relay US has disconnected itself from the conductor *c2* by opening of contact 5*us*. The testing is thus without result; relay U in the setting set is not actuated. Now, after the release of relay CE, relay E is connected:

(17) +, 82*s*, 28*v*, 86*d*, 25*ce*, 26*se*, 5*an*, EI, EII, —.

Thereupon relay D is actuated with time delay by way of resistor W*i*5:

(18) +, 82*s*, 28*v*, W*i*5, 22*e*, D, —.

Relay D is held by way of its contact 24*d* independently of relay E and by opening its contact 86*d* opens the circuit of the relay E. Relay E releases with time delay. Relay D connects the motor of the connector at contact 31*d* (cf. circuit 11). The connector operates and now seeks the marking conductor 6 over the contact bank of the *d*-wiper in the marking contact bank. When the conductor 6 is found, the test relay P energizes:

(19) +, P, 43*u*, W*i*2, 39*d*, wiper *m*III, *d*-wiper (16), marking conductor 6, 69*w*, 59*t*, 55*r*, 53*s*, 45*v*, 46*u*, W*i*1, —.

Relay P stops the operation of the switch by closing the contact 29*p*. Relay P furthermore connects relay PH:

(20) +, 16*a*/17*d*, 18*u*, 20*p*, PH, —.

Relay PH is held independently of relay P by way of its contact 21*ph*. Moreover, relay PH connects the seizure relay C of the final selector:

(21) +, 32*ph*, wiper *m*V, CI, —.

Relay C by opening contact 1*c* disconnects relays AN and A of the setting set from the incoming *a2*-conductor. Relay A, however, has already released upon response of relays P and PH. By the release of relay A, the individual set was released. Relay C of the connector, by opening contact 73*c*, opens the decade marking circuit and connects over contact 74*c* the incoming *c2*-conductor to the *c*-wiper of the connector for individual testing. Relay PH, by way of the incoming *c2*-conductor, causes the seizure relay CS of the feed relay set to energize:

(22) (FIG. 3) +, 34*ph*, wiper *m*IV, *c2*-conductor, (FIG. 2) 7*us*, 8*cs*, CSII, —.

Relay CS holds itself independently of relay US in the following circuit:

(23) +, wiper *c* (IIGW), *c*-conductor, CSI, 9*cs*, CSII, —.

Relay C in the connector is held, by way of contact 72*c* and the incoming *d2*-conductor:

(24) (FIG. 2) +, 10*cs*, W*i*7, *d2*-conductor, (FIG. 3) 72*c*, CII, AD, —.

In this circuit, the line wiper control magnet AD of the connector also energizes, such magnet pressing the line wipers against the corresponding bank contacts and thereby extending the two line conductors through.

Upon actuation of relay CS in the feed relay set, relay TS is energized:

(25) +, 10*cs*, 11*us*, 12*gs*, TSI, —.

Relay US after the opening of contact 4*cs* is held in the following circuit:

(26) +, 14*us*, 15*cs*, USII, 13*ts*, —.

Relay TS is held independently of relay US:

(27) +, 10*cs*, 16*ts*, 12*gs*, TSI, —.

Upon actuation of relay TS, relay GS is energized:

(28) +, 10*cs*, 22*zs*, G*r*IV, 21*ts*, BSI, —.

Relay GS is held independently of relay TS in the following circuit:

(29) +, 10*cs*, 22*zs*, G*r*IV, 23*gs*, GSII, BSI, —.

Relay GS opens the holding circuit of relay TS at contact 12*gs* (cf. circuit 27). During the release of the relay TS, the test relay PS is connected to the outgoing conductor *c2*:

(30) +, 14*us*, 15*cs*, 20*gs*, PSII, 17*ts*, PSI, conductor *c2*, (FIG. 3) 74*c*, *c*-wiper (16), 77*rn*, TN, W*i*R, —.

If the subscriber 16 accessible to the connector is idle, relay PS of the feed relay set actuates in the above circuit. Relay PS by short-circuiting of the high-resistance winding PSIII, blocks the seized line via contact 19*ps*, in the customary manner against being otherwise occupied. Upon actuation of relay PS, the battery feed bridge relay AS for the called subscriber is connected by the closed contacts 25*ps* and 26*ps* to the two line conductors *a2*, *b2*. At the same time, relay RS is connected by relay PS:

(31) +, 10*cs*, TSIII+II, 30*ts*, 29*ps*, RSI, 32*zs*, 34*as*, —.

Relay RS, by way of its contact 28*rs* connects ringing current to the upper line conductor *a2* which is grounded at the contact 25*ps* via the ringer of the desired subscriber and the lower line conductor *b2* and contact 38*as*. At the same time, the ringing tone is transmitted to the calling subscriber:

(32) +, OLUV, W*i*4, 41*ps*, 40*rs*, FZ, +.

The ringing tone is transmitted to the calling subscriber by way of windings I, II of the transformer OLU. Upon release of relay TS, relay US is disconnected while relay RS is energized for further ringing by the operational of a 10 sec.-switch:

(33) +, 10 sec. 31*ts*, 29*ps*, RSI, 32*zs*, 34*as*, —.

When the called subscriber responds during a ringing pause, the battery feed bridge relay AS energizes:

(34) +, 25*ps*, 38*as*, conductor*b2*, subscriber's loop, conductor *a2*, ASII, 26*ps*, 27*rs*, —.

Relay AS, by opening its contact 38*as*, interrupts the short-circuit for the winding I connected to the conductor *b2* and by closing its contacts 39*as*, 50*as*, connects the call through over the two line conductors. The connection between the two subscribers is now established.

If the test relay PS of the battery feed relay set (FIG. 2*b*) does not find the subscriber line idle, then the relays PS and RS do not energize. The calling subscriber receives a busy signal.

(35) +, OLUV, W*i*4, 42*ps*, 44*rs*, 43*gs*, BZ, +.

He thereupon hangs up and thereby terminates the connection. The incoming *c*-conductor is accordingly interrupted from the third group selector and the holding circuit of the seizure relay CS is opened. Relay CS releases and opens the holding circuit of relay GS, so that the feed relay set is again freed.

In the connector (FIG. 3*b*), upon release by disconnecting of the ground potential at contact 10*cs* from conductor *d2*, the seizure relay C as well as the wiper control magnet A*d* deenergize. As a result, the connector is again ready for another call.

Let us now consider the case that the calling subscriber desires to call a private branch exchange subscriber. In the connector shown in FIG. 3, there are for instance provided two private branch exchange subscribers; the one private branch exchange subscriber having the terminal telephone number "11" lying in decade 1, is provided with five central office lines. In the private branch exchange subscriber, there is included a night-call number "13." The consecutive lines of this private branch exchange subscriber are connected to the steps 11 . . . 15. The second private branch exchange subscriber, having the terminal telephone number "18," also lying in the first decade, extends however into decade 2, since it is provided with 6 lines For the invention, there is of importance in particular the connecting of the private branch exchange subscribers to the outlets of the *d*-contact bank of the connector. While in the *c*-contact bank of the connector, as in the case of the single-line subscribers, in each case the group marking (decade marking by the tens digit) lies on the unconnected group contacts disposed in front of a decade, in which connection the individual testing on the individual steps is effected from the battery feed relay set Sp*ULa*, in the multiple of the *d*-contact bank the single-line subscribers, the private branch exchange subscribers and the night-call numbers are placed on marking by the individual digits. Furthermore, the group contacts of this contact bank are combined into a common line "*gem*" to which marking potential is applied in specific cases. If a subscriber's number not covered by special marking is dialed by error, the switch as a result will not run onto a wrong connection in another decade, but will first be held at the beginning of the next decade, as a result of which the calling subscriber receives a busy signal.

The individual phones, for instance with the terminal numbers 16, 17, are in the same way as for instance the individual phones with the terminal numbers 23, 24, 25, 26, 27, 29, 20, conducted directly individually to the marking conductors 3, 4, 5, 6, 7 9 0. On the other hand the lines of the private branch exchange subscribers are combined electrically over a connecting point X for private branch exchange subscriber "11" and over a connecting point "Y" for private branch exchange subscriber "18" respectively and only the last line, in which a high-resistance resistance lies, is conducted to the corresponding marking line. Thus for private branch exchange subscriber "11," the last line is conducted via the high-resistance resistance W*i*15 to the marking conductor 1, while for private branch exchange subscriber "18," the last line 28 is conducted to the marking conductor 8 via the high-resistance resistance W*i*28. The last lines of the private branch exchange subscribers are in each case also connected directly to the marking conductors. Furthermore, the lines of the interspersed night-call numbers have direct branches in front of the connecting point to the marking conductors corresponding to their terminal number. Thus the night-call line "13" is conducted via a decoupling rectifier G*r*N3 to the marking conductor 3 and the night-call line "22" is connected via rectifier G*r*N2 directly to the marking conductor 2. Finally, there is also conducted to the common connecting point, for instance Y, of the private branch exchange subscriber "18," the group contact, for example "1," to the group of which at least the first line of this private branch exchange subscriber belongs, while the other lines can extend into a following decade. The purpose of this arrangement is to permit the passage of the switch from the first decade into the following decades.

The customary pretesting of the lines of the private branch exchange subscribers, as to whether they are idle or busy is effected by means of a test circuit via the transistor amplifier T*r* and the *c*-wiper of the connector to the corresponding subscriber circuit TS*ch* in cooperation with the parallel marking test circuit via the *d*-contact bank of the connector.

The general description having been rendered, the switching operations will not be described in detail.

It shall first be assumed that the calling subscriber dials the private branch exchange subscriber number "11." The setting of the connector by the tens digit "1" is effected in the same way as in the case of a call to a single-line subscriber. Due to the group marking in the *c*-contact bank, the connector is set to the stop position in front of the first decade. Thereupon, the setting set is again released. The fact of the setting of the final selector by the tens digit is recognized in the feed relay set Sp*ULa* by a local holding circuit of the relay US.

The operation of the setting set is started again responsive to the units digit "1." The switching operations are in this case initially identical to those occurring when a call is extended to a single-line subscriber. It should be noted that in the case of the assumed private branch exchange subscriber, no test circuit for the relay SE is closed before the setting of the connector by the units digit to the group contact position "1" in the *d*-contact bank. As a result, relay E, which energized responsive to the units digit and connected the relay D, releases again upon actuation of relay D. The switch is operated again depending upon the actuation of the relay D in order to seek the marked step "11." It may be noted here that relays R and S of the counting relay circuit become actuated responsive to the last digit "1," whereby the marking conductor 1 is connected through. When the switch arrives at step 11, the following test circuit is closed:

(36) +, P, 43*u*, W*i*2, 39*d*, wiper *m*III, wiper *d*(11), X, W*i*15, marking conductor 1, 62*t*, 56*r*, 53*s*, 45*v*, 46*u*, W*i*1, —.

The value of the resistor W*i*15 is such that only a weak current flows in the test circuit, preventing energization of relay P. The marking potential thus supplies non-operate current. On the other hand, due to the voltage drop at the resistor W*i*2, the transistor T*r* is made conductive since a current can flow from the emitter E*m* to the base B*a*. The transistor in its turn is connected by way of the individual test wiper *c* of the connector to the subscriber circuit TS*ch* of the private branch exchange subscriber line 11. If the subscriber circuit is occupied by either an incoming or an outgoing call, in which case corresponding blocking ground is supplied to the *c*-conductor or relay RN has energized, due to which contact 77*rn* is opened, the unlocking of the transistor in the marker remains without effect. Since test relay P does not energize, the connector continues to rotate its wipers onto the next line and tests there again at high resistance in the marking circuit by way of the *d*-wiper while the transistor T*r* tests at the same time on the corresponding subscriber circuit of such next line. The connector rotates its wipers in this manner until it finds an idle line of the private branch exchange subscriber. As soon as this is the case, an amplified current flows by way of the emitter E*m*-collector K of the transistor and the test circuit to the subscriber circuit. As a result, relay P which has a common branch with the marking circuit and the transistor test circuit, will now energize over the transistor circuit:

(37) +, P, 43*u*, E*m*, K(T*r*), 41*u*, 36*d*, *m*II, 73*c*, *c*-wiper (11), 77*rn*, TN, W*i*R, —.

Relay P causes the selector to stop, and connects the auxiliary test relay PH. Relay PH thereupon indicates all further switching operations in the connector and in the feed relay set Sp*ULa*, which have already been described.

Since a part of the private branch exchange subscriber is covered only by the corresponding call number, but not independently by the marking, a calling subscriber who for instance dials erroneously the terminal call number "15" instead of "11" could, in connection with the individual step-setting of the connector over the marking multiple of the *d*-contact bank find marking potential only at step 25. The calling subscriber would thereby receive a wrong connection. In order to prevent this, the group contacts in front of the decades in the multiple of the *d*-contact bank of the connector are combined into a line "*gem*," whereby the switch is in the present case held on the group contact of decade 2. This is effected by the slow-to-release relay E. The group marking steps at the multiple of the *d*-contact bank are, in case of the individual step setting, placed on marking potential with a delay corresponding to the release delay of relay E. The release time of the relay E which, as can be noted from the above description, releases upon the commencement of the switch operation for the individual steps, should be such that the switch wipers have definitely left the first group marking step, but has not yet reached the next group marking step. Contact 42e is in such case already closed when the switch reaches the next group marking step. If the subscriber, therefore, erroneously dialed the number "15," the selector will be held at the decade marking step 2. At this step the feed relay set of the connector gives the busy signal to the calling subscriber, since it cannot find potential signifying idle condition at the individual line test conductor over the c-wiper of the connector after the connecting-through operation, on the one hand due to the marking of "5" while on the other hand the rectifiers Grd1 . . . 0 prevent the test relay in the feed relay set from erroneously evaluating the marking potential over resistor Wi1 as a potential signifying idle condition.

It shall now be assumed that the calling subscriber desires connection with the private branch exchange subscriber having the terminal number "18."

The switching operations up to the setting of the connector by the tens digit 1 and the units digit 8 correspond to those already described. After receipt of the 8th pulse of the dial series, the relays T and W of the counting relay circuit are energized as can be noted from the relay table. After the release of relay CE, relay E again energizes. Relay E connects relay D, which energizes with long time delay over resistor Wi5. Now, prior to the connector coming to the marking conductor 8, characterized by the units digit, the following circuit is closed for relay SE during the energization time of the relay D:

(38) +, SEI, 37e, 38d, wiper mIII, wiper d (1), GrH, Y, Wi28, marking conductor 8, 64w, 58r, 54t, 52s, 45v, 46u, Wi1, —.

Relay SE energizes and holds itself in series with relay E in the following circuit:

(39) +, 2s, 83t, SEII, 27se, 5an, e6, EII, —.

Relay E remains energized in this circuit. Contact 42e in the common conductor "gem" accordingly remains open, whereby the marking potential is disconnected from the group contacts by way of resistor Wi7. As a result, the connector, upon seeking the private branch exchange subscriber "18" can move over the group contact 2 in front of the decade 2 and thus can also test the lines of the private branch exchange subscriber lying in decade 2. If the connector finds an idle line of the private branch exchange subscriber, the test relay P again energizes in series with the transistor Tr in the test circuit to the subscriber circuit extending over the c-wiper. The energization of relay P effects energization of relay PH. This results on the one hand in the final occupying of the connector, release of the marker and, on the other hand, in the taking over of the other functions such as checking, first ringing, further ringing by the feed relay set SpULa. The corresponding switching operations have already been described.

If no line of the private branch exchange subscriber "18" is idle, the connector operation is stopped at step 28 where relay P finds marking potential directly by way of the resistor Wi1:

(40) +, P, 43u, Wi2, 39d, mIII, d (28) marking conductor 8, 64w, 58r, 54t, 52s, 45v, 46u, Wi1, —.

The condition of the subscriber circuit of this last line is in this case unimportant. It is checked from the feed relay set SpULa. If it is idle, the subscriber is called; if it is occupied, the calling subscriber receives a busy signal from the feed relay set.

If the calling subscriber dials directly the night call number "22" contained in the private branch exchange connection "18," the connector will be stopped at the night call number, since on the one hand after the dialing of the units digit "2" the relay S of the counting relay circuit is energized and thus the marking wire 2 is connected through while on the other hand, step 22 is marked by way of rectifier GrN2 directly in the same way as a single-line subscriber is marked by the marking wire 2. Relay P again responds in such a case and effects, as already described, the final occupying of the connector, release of the marker and the taking over of the further functions in the feed relay set.

The release of the connection is effected as already described by hanging up the receiver at the calling station resulting in the release of the feed relay set and thereupon release of the connector.

Changes and modifications may be made within the scope and spirit of the appended claims which define what is believed to be new and desired to have protected by Letters Patent.

I claim:

1. In a telephone system and the like, a circuit arrangement for connector switches having access to private branch exchange lines and comprising devices for setting said connector switches which are respectively common to a plurality of connector switches, wherein the marking of decades is effected over respectively different contact banks by tens digits and that of individual lines by units digits, said circuit arrangement comprising means controlled by a marker device for marking in the multiple of an auxiliary contact bank of a seized connector the decade contacts over which individual lines are to be subsequently tested, a relay set including resistance means cooperable with the seized connector while marking in the multiple of another auxiliary contact bank of the connector the individual lines and private branch exchange lines over said relay set, whereby individual lines are marked directly while private branch exchange lines are preparatorily marked by way of said resistance means, means including an auxiliary wiper of the connector for simultaneously producing a testing circuit for ascertaining the condition of the private branch exchange lines, and means controlled by testing means in said testing circuit for finally completing the marking circuit for the private branch exchange lines in the presence of an idle line to effect stopping of the wipers of said connector switch in engagement with the bank contacts connected with such idle line.

2. A circuit arrangement according to claim 1, wherein the marking of private branch exchange lines is effected in a circuit including high resistance resistor means while the marking of other lines including individual lines, lines for night calls and the like are marked in a low resistance circuit, the high resistance circuit unblocking a test circuit extending by way of the multiple of the auxiliary contact bank to the line circuits of the private branch exchange lines without causing actuation of the testing relay, said unblocked test circuit comprising a common branch containing the testing relay of the marking circuit.

3. A circuit arrangement according to claim 2, wherein the testing relay for the marking circuits of the individual lines serves in the multiple of a further auxiliary contact bank as a testing relay for the marking of decade contacts in the multiple of the first named auxiliary contact bank of the connector.

4. A circuit arrangement according to claim 3, comprising a switch-over relay forming part of the marker device for effecting the switching from one to the other marking circuit, and a connection device preceding the connector and individually allotted thereto for controlling the actuation of said switch-over relay depending upon the transmission of a characteristic of the tens digit transmitted to the connector.

5. A circuit arrangement according to claim 4, wherein the switching-over effects change of polarity of the testing potential in the two marking test circuits.

6. A circuit arrangement according to claim 2, comprising a highly sensitive electronic amplifier element included in the testing circuit which is unblocked from the high-resistance marking circuit of a private branch exchange connection extending from the marking device over the first named test wiper of the connector to the subscriber circuits, said amplifier element being coupled to a branch of the high-resistance marking circuit and being unblocked by the weak current flowing in the marker circuit and in turn effecting upon simultaneous testing of an idle line actuation of the testing relay in the corresponding test circuit due to increased current flowing in such circuit.

7. A circuit arrangement according to claim 6, comprising means for electrically connecting the outlets of a private branch exchange line in parallel in the multiple of the marking contact bank of the connector and connecting only the last outlet directly to the marker conductor which marks the corresponding private branch exchange line and from such conductor by way of a high resistance resistor to the connecting point over which the remaining outlets are connected.

8. A circuit arrangement according to claim 7, wherein night call lines included in the private branch exchange lines are provided with low-resistance connections, branching off ahead of the connection point at which the lines are galvanically connected, and extending to marker lines identified by the night-call number.

9. A circuit arrangement according to claim 7, comprising a low-resistance connection for the last line of a private branch exchange number, such connection being branched off ahead of the high-resistance resistor and extending to the marker line identified by the private branch exchange number, said testing relay operatively responding to said low-resistance connection regardless of the busy or idle condition of the corresponding line for stopping the switch wipers in engagement therewith, the testing of such line being effected by transmission means cooperatively associated with the connector.

10. A circuit arrangement according to claim 7, comprising switching means in said marker device and wiring means in the marker multiple, said switching and wiring means, in the case of private branch exchange lines, lying exclusively within a marked decade group incident to direct selection of a private branch exchange line, not included in the marker device, by transmission of the units digit corresponding thereto, effective to prevent overrunning of the switch wipers to a line of another contact group identified in the marker multiple, by the corresponding units digit while avoiding such blocking action when the private branch exchange lines extend into a further contact group.

11. A circuit arrangement according to claim 10, wherein the marker contact bank of the individual lines of the connector has all group contacts connected to a common wiring, and means for connecting to said wiring marking potential for the energization of the testing relay, by way of a slow-to-release relay of the marking device which relay deenergizes after receipt of the units digit, before the wipers of the connector in the marked decade, following receipt of the units digit, reach the next group contact so as to effect stopping of the switch wipers ahead of the corresponding contact group.

12. A circuit arrangement according to claim 10, applicable when the lines of a private branch exchange number are included in a decade succeeding the corresponding marked decade, comprising means for connecting the group contact of the marked decade in the marker contact bank with a contact of the last line of the private branch exchange number appearing in the succeeding decade, a supervising relay disposed in the corresponding circuit and operatively affected by said last-mentioned means, within the delay interval of a relay which controls the initial operation of the connector, to prevent the deenergization of relay means controlling the connection of the marking potential to the group contacts.

13. A circuit arrangement according to claim 11, applicable when the lines of a private branch exchange number are included in a decade succeeding the corresponding marked decade, comprising means for connecting the group contact of the marked decade in the marker contact bank with a contact of the last line of the private branch exchange number appearing in the succeeding decade, a supervising relay disposed in the corresponding circuit and operatively affected by said last-mentioned means, within the delay interval of a relay which controls the initial operation of the connector, to prevent the deenergization of relay means controlling the connection of the marking potential to the group contacts.

References Cited in the file of this patent

UNITED STATES PATENTS

| | | |
|---|---|---|
| 2,582,967 | De Raedt | Jan. 22, 1952 |
| 2,602,122 | Lesigne | July 1, 1952 |
| 2,764,635 | Lesigne | Sept. 25, 1956 |
| 2,816,171 | Geels et al. | Dec. 10, 1957 |